(12) United States Patent
Emond

(10) Patent No.: US 6,751,901 B2
(45) Date of Patent: Jun. 22, 2004

(54) HUMANE ANIMAL TRAP, AND METHOD OF USE THEREOF

(76) Inventor: Gérard Emond, 555 de Chantelle, Charlesbourg, Quebec (CA), G1G 2Z3

( * ) Notice: Subject to any disclaimer, the term of this patent is extended or adjusted under 35 U.S.C. 154(b) by 0 days.

(21) Appl. No.: 10/361,998

(22) Filed: Feb. 7, 2003

(65) Prior Publication Data

US 2003/0126786 A1 Jul. 10, 2003

Related U.S. Application Data

(63) Continuation-in-part of application No. 10/022,422, filed on Dec. 20, 2001, now abandoned.

(51) Int. Cl.[7] .............................................. A01M 23/24
(52) U.S. Cl. .................................. 43/87; 43/88; 43/96
(58) Field of Search ................................ 43/87, 88, 96

(56) References Cited

U.S. PATENT DOCUMENTS

| | | | |
|---|---|---|---|
| 716,255 A | 12/1902 | Leonard | |
| 1,031,728 A | 7/1912 | Obiols | |
| 1,577,000 A | 3/1926 | Smith | |
| 1,630,419 A | 5/1927 | Fortin | |
| 1,913,893 A | * 6/1933 | Morrill | 43/87 |
| 2,216,927 A | * 10/1940 | Van Cleve et al. | 43/87 |
| 2,592,390 A | 4/1952 | Burt | |
| 4,045,905 A | 9/1977 | Souza | |
| 4,389,807 A | * 6/1983 | Novak | 43/96 |
| 4,549,367 A | 10/1985 | Jones, Sr. | |
| 4,581,844 A | 4/1986 | Torkko | |
| 5,907,922 A | * 6/1999 | Belisle | 43/87 |

* cited by examiner

Primary Examiner—Michael J. Carone
Assistant Examiner—Susan C. Alimenti
(74) Attorney, Agent, or Firm—Francois Martineau

(57) ABSTRACT

A two-jawed trap including a cable snare encircling spring-loaded jaws when the trap is set. When the trap is sprung, it is constructed to disconnect the spring from the jaws under load from the animal making desperate forcible attempts to release the trap, thus allowing the jaws to open from the leg of the animal. However, the snare is set at the same time that the trap is sprung, so the animal remains caught by the snare even though the trap rigid frame including the jaws releases and completely detaches from the animal leg.

2 Claims, 5 Drawing Sheets

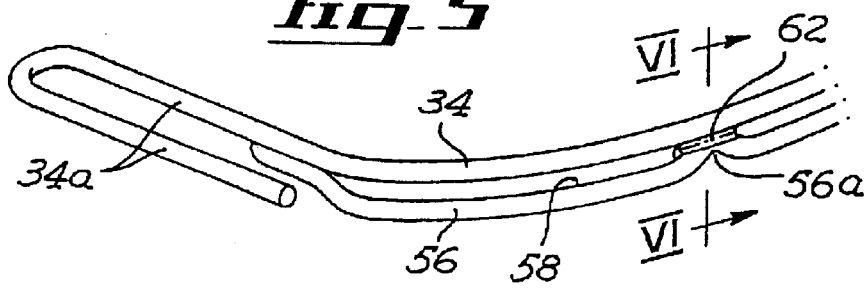
Fig_5
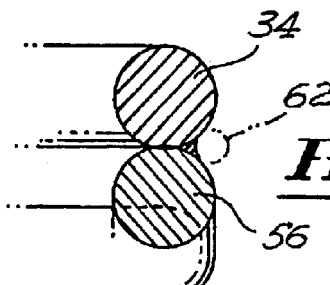
Fig_6
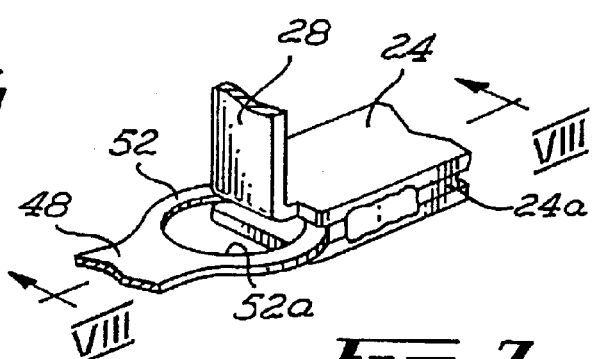
Fig_7
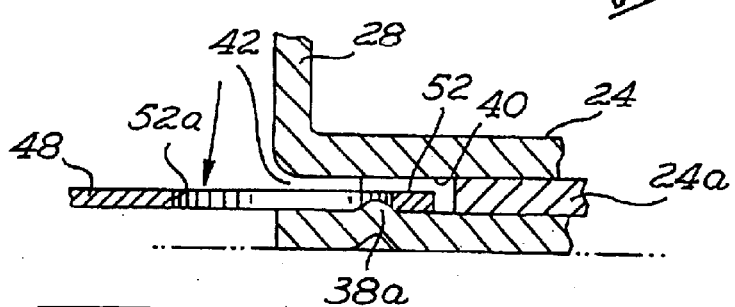
Fig_8
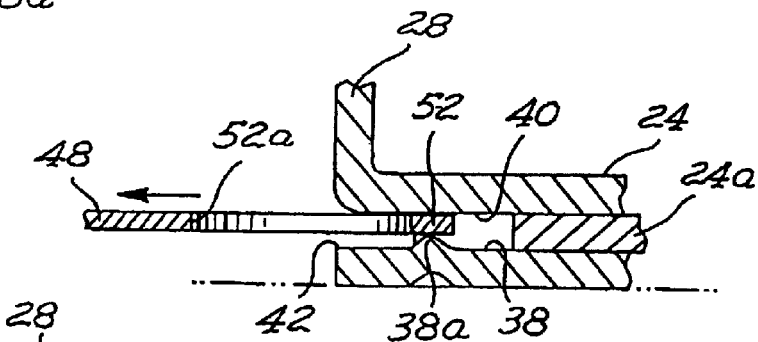
Fig_9
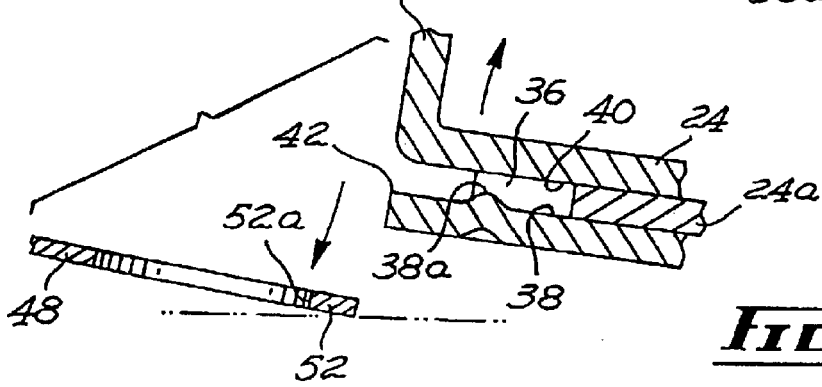
Fig_10

HUMANE ANIMAL TRAP, AND METHOD OF USE THEREOF

CROSS-REFERENCE DATA

This is a Continuation-In-Part patent application of U.S. patent application Ser. No. 10/022,422 filed on Dec. 20, 2001 now abandoned, by the present applicant.

FIELD OF THE INVENTION

This invention relates to traps for catching animals in the wild, and in particular to so-called "humane" traps that minimize or prevent injuries to animals sustained when and after an animal is caught while providing reliable physical retention of the animal about the trap.

BACKGROUND OF THE INVENTION

Traps intended for the catching of animals—mainly mammals—in the wild, consist essentially of snares, or facing jaw traps. The jaws of some conventional traps are provided with sharp teeth, for penetrating deep into and maintaining firmly one of the legs of the animal caught by the trap. The pressure applied by those jaws is always very strong, which has the effect of severely wounding the trapped animal, before release by the hunter. Some of these animal may even die of their injuries before the hunter comes back to his trap. Snares thrown too quickly may also cause the same results. Moreover, these types of traps do not allow one to carry out a selective hunting whereby the animals so trapped cannot be released, because the extent of bodily injuries sustained by these animals would be such as to require expensive veterinary cares that are beyond the means of most hunters. Also, domestic animals, or animals protected under law (e.g. endangered species) may be accidentally trapped and injured or killed.

Alternate trap embodiments that attempted to deal with the above-noted bodily injuries to the caught animal, have several drawbacks. One such drawback is that these modified traps are too easy for the trapped animal to open and freely escape therefrom, and thus are unreliable. Existing humane traps still do inflict some bodily injuries, although to a lesser degree than conventional traps with sharp teeth jaws. The unstable rigid frame of some humane traps can hamper the effective operation of the slip-knot lace involved in the animal retention. Some other humane traps can also be rendered ineffective by becoming damaged under the load of a more powerful wild animal, such as a wolf.

U.S. Pat. No. 1,031,728 issued in 1912 (inventor Obiols) and U.S. Pat. No. 4,389,807 issued in 1983 (inventor Novak) both show an animal trap which comprises a snare which lies on the ground in the case of the Novak device, and which lies on the ground-resting frame in the case of the Obiols patent. A trigger located centrally of the snare will release a spring-loaded arm when stepped upon, so as to pull the snare up on the animal's leg. This type of trap is rather conventional, and has been found to be unreliable, since the animal often has enough time to retrieve his leg once the mechanism is triggered and before he is ensnared. Also, this trap often moves or tilts when stepped on by the animal, which will result in the spring-loaded arm carrying the snare along the ground instead of up the animal leg. Finally, an animal standing above the pivotable arm may prevent the trap from functioning.

U.S. Pat. No. 4,581,844 issued in 1986 (inventor Torkko) discloses an animal trap which is similar to the above-mentioned Obiols and Novak devices, with the exception that the snare rests on a unitary integral circular frame ring that is attached to the spring-loaded pivotable arm. Thus, upon the animal triggering the trap, the frame ring carries the snare in its upward pivotal displacement along the leg of the animal, to increase the likelihood that the animal will indeed be ensnared. Although animals may indeed be caught more easily with such a snare, it remains unreliable since the pivotal motion of the long spring-loaded arm is too slow to ensnare some animals and animals standing above the pivotable arm may prevent the trap from functioning. Moreover, and more importantly, the Torkko snare will often injure animals, since the rigid frame of the trap will remain caught on the animal's leg, due to the fact that the animal leg extends through the rigid frame ring. When the animal realizes that he has been ensnared, he will kick and struggle to break free and consequently is likely to injure himself by flailing the rigid trap frame about.

U.S. Pat. No. 5,907,922 issued in 1999 (inventor Belisle) shows an animal trap comprising a ground resting frame carrying a pair of opposite, pivotable, spring-loaded jaws. The jaws will close themselves upon the animal stepping on a central trigger. A snare lace, initially located under the jaws, will close upon the animal's leg due to the animal struggling to break free from the rigid frame. However, a problem with the Belisle trap is that the rigid frame will more often than not remain attached with the snare lace on the animal's leg. As the animal kicks and struggles to break free, he will involuntarily flail the rigid frame against himself, injuring himself.

SUMMARY OF THE INVENTION

The invention relates to a trap for use with a snare for ensnaring animals, the snare of the type including a loop lace, a loop lace anchoring line linked to the loop lace and anchoring means for fixedly anchoring the anchoring line, said trap comprising:

a ground-resting frame;

first and second jaws pivotally carried by said frame, said jaws being movable between an opened position in which said first and second jaws are spread apart, and a closed position in which said first and second jaws are closed against each other;

releasable biasing means that bias said jaws towards said closed position;

a lock movable between a first operative position, in which it retains said jaws in said opened position against the bias of said biasing member, and a second inoperative position in which it releases said jaws to allow them to move towards said closed position under the bias of said biasing mean;

a lock trigger for forcing said lock towards said inoperative position upon a load being applied thereon; and a loop lace channel for carrying the snare loop lace, said loop lace channel comprising a first channel portion on said first jaw and a second channel portion on said second jaw, said first and second channel portions thus being movable with said first and second jaws, respectively, between said opened and closed positions of said jaws for carrying the loop lace with said jaws from said opened position towards said closed position, for positively moving said loop lace around an animal leg upon said jaws being triggered to move into said closed position on the animal leg.

In one embodiment, the trap further comprises a biasing means disabling system for selectively disabling said biasing means thus selectively cancelling its biasing action on said jaws.

In one embodiment, said biasing means is a resilient U-shaped spring member defining a first and a second leg, with said first leg releasably engaging a recess in said frame and with said second leg engaging said first and second jaws to bias said jaws towards said closed position, said biasing means disabling system comprising a spring member anchor line attached to said spring member at a first end thereof and destined to be fixedly anchored at a second end thereof whereby said spring member first leg can be forcibly removed from said recess to disable said biasing means thus selectively cancelling its biasing action on said jaws.

The invention also relates to a trap for ensnaring animals comprising:

- a snare comprising a loop lace, a loop lace anchoring line linked to the loop lace and anchoring means for fixedly anchoring the anchoring line;
- a ground-resting frame;
- first and second jaws pivotally carried by said frame, said jaws being movable between an opened position in which said first and second jaws are spread apart, and a closed position in which said first and second jaws are closed against each other;
- releasable biasing means that bias said jaws towards said closed position;
- a lock movable between a first operative position, in which it retains said jaws in said opened position against the bias of said biasing member, and a second inoperative position in which it releases said jaws to allow them to move towards said closed position under the bias of said biasing mean;
- a lock trigger for forcing said lock towards said inoperative position upon a load being applied thereon; and
- a loop lace channel carrying said snare loop lace and comprising a first channel portion on said first jaw and a second channel portion on said second jaw, said first and second channel portions thus being movable with said first and second jaws, respectively, between said opened and closed positions of said jaws and carrying said loop lace with said jaws from said opened position towards said closed position, for positively moving said loop lace around an animal leg upon said jaws being triggered to move into said closed position on the animal leg.

In one embodiment, said biasing means is a resilient U-shaped spring member defining a first and a second leg, with said first leg releasably engaging a recess in said frame and with said second leg engaging said first and second jaws to bias said jaws towards said closed position, said trap further comprising a spring member anchor line attached to said spring member at a first end thereof and destined to be fixedly anchored at a second end thereof whereby said spring member first leg can be forcibly removed from said recess to disable said biasing means thus selectively cancelling its biasing action on said jaws.

In one embodiment, the trap further comprises a temporary retaining device on said anchoring line intermediate said loop lace and said anchoring means, said temporary retaining device being destined to be releasably anchored, the length of said loop lace plus the length of said loop lace anchoring line between said loop lace and said temporary retaining device being equal to or less than the length of said spring member anchoring line, and the length of said spring member anchoring line being less than the length of said loop lace anchoring line.

In one embodiment, said temporary retaining device is a ground peg for releasable engagement of said ground peg in the ground.

BRIEF DESCRIPTION OF THE INVENTION

In the annexed drawings:

FIG. 5 is an enlarged view of a wire section of the trap;

FIG. 6 is an enlarged cross-sectional view taken along line VI—VI of FIG. 5;

FIG. 7 is an enlarged perspective view of the release arm assembly of the trap;

FIG. 8 is an enlarged sectional view taken along line VIII-VIII of FIG. 7; and

FIGS. 9 and 10 are views similar to FIG. 8, but suggesting how the release arm of the trap can detach from the trap frame.

DETAILED DESCRIPTION OF THE PREFERRED EMBODIMENT OF THE INVENTION

Figure 1:
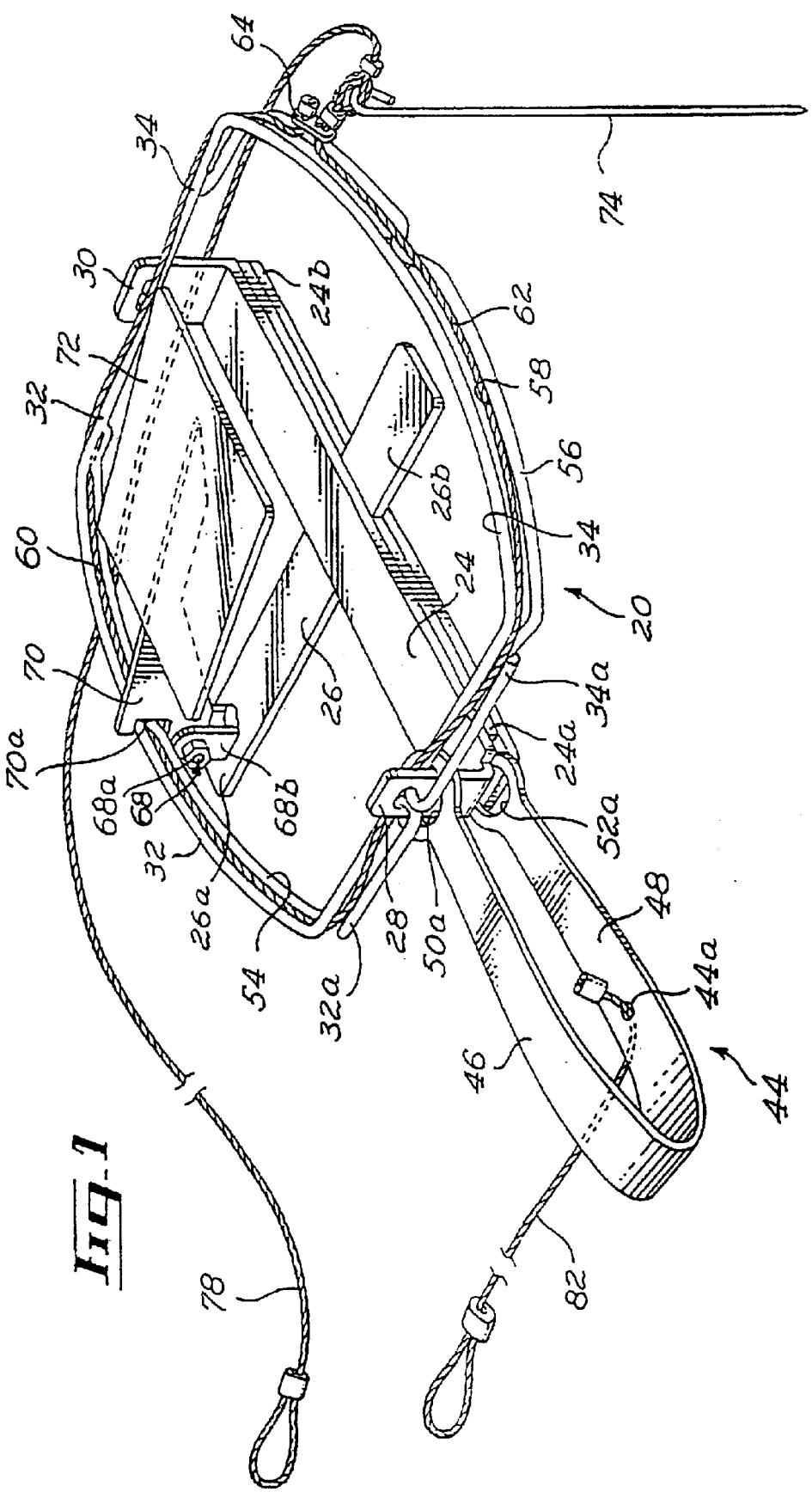
FIG. 1 is a perspective view of a preferred embodiment of animal trap, shown in the cocked condition, and associated ground peg.

FIGS. 1–4 show an animal trap 20 according to the present invention. Trap 20 includes a planar rigid cross-shaped frame 22 defining two perpendicular elongated legs 24, 26 having corresponding opposite end portions 24a, 24b, and 26a, 26b, respectively. Legs 24, 26 of frame 22 are adapted to lay flat against the ground. Each of the frame two opposite end portions 24a, 24b, includes a short upturned flange 28, 30. Each flange 28, 30, includes a bore 28a, 30a, receiving the opposite elbowed hook end portions 32a, 34a, and 32b, 34b, respectively of a pair of elongated rigid U-shape wire members 32, 34. Each wire member 32, 34, extends from and joins one flange 28 to the other flange 30. Hook end portions 32a, 34a, should be much longer than hook end portions 32b, 34b. Frame leg end portion 24a also includes a recess 36 (FIGS. 8–10) beneath the corresponding said upturned flange 28. Recess 36 defines a flooring 38, a top wall 40 and a mouth 42 opening orthogonally relative to the orientation of upstanding flange 28. The recess flooring 38 includes an intermediate projecting bulge or boss 38a, located spacedly from the recess mouth 42 and from the top wall 40 thereof.

An elongated spring-loaded U-shape handle member 44 is further provided on trap 20, defining two legs 46 and 48, having opposite end portions 50 and 52, respectively, each having a large circular aperture 50a, 52a. In the released, uncocked condition of the trap 20 illustrated in FIG. 3, the two U-shape wire legs 32, 34, extend in generally upright condition substantially parallel to one another; the opposite ends 50, 52 of the two legs 48, 50 of spring-loaded handle member 44 are at their farthest apart position; and upper circular aperture 50a is slidingly engaged by the four segments of elbowed hook end portions 32a, 34a. Alternately, in the trap cocked condition illustrated in FIGS. 1 and 8, the two U-shape wire legs 32, 34, are spread apart in a generally coplanar fashion to form open jaws; the opposite ends of legs 46, 48 of the spring member 44 are brought closer toward one another, slidingly along hook end portions 32a, 34a, to surround flange 28 beneath the plane formed by the coplanar open jaws 32, 34; the spring member lower end portion 52 is snap-fitted into recess 36 with the spring member aperture 52a being partially engaged by bulge 38a; and the spring member lower end portion 52 extends generally coplanar to the trap frame leg 24.

According to an important feature of the present invention, FIGS. 8 to 10 of the drawings suggest that the lower end 52a of spring member 44 located inside the trap frame recess 36, should remain engaged into recess due to the spring loading of spring member 44, during cocking as well as uncocking of the trap 20. It is difficult to release spring member lower end 52a from frame recess 36, because it is wedged therein by the spring load of spring member 44 and spring member aperture 52a is engaged by bulge 38a. However, a pivotal displacement of handle member 44 about an axis extending through frame recess 38 and perpendicular to the general place defined by frame 24, 26, will allow spring member aperture 52a to disengage from bulge 38a with relative ease. A slight pull on handle member 44 may then dislodge spring member 52 from recess 38.

The intermediate U-shape section of each jaw 32, 34, includes an additional U-shape wire member 54, 56, respectively. Wire members 54, 56, merge at their opposite ends integrally with the jaw wires 32, 34, but otherwise extend generally spacedly parallel from the main portion of the jaw wires 32 and 34 to form therebetween a channel 58 and 60, respectively. Shallow reinforcing bridges 54a, 56a, link arms 32 and 54, and arms 34 and 56, respectively, at selected spaced intervals therealong. Alternately, the wire members 54, 56, could abut along their full length (not shown) against the jaw wires 32, 34, but then wires 32, 34, 54 and 56 should be sized and shaped relative to one another as to define therebetween a U-shape groove or channel (not illustrated) that would be functionally equivalent to channels 58, 60. Channels 58, 60, are adapted to receive and releasably retain a snare or loop lace 62.

Double jaws 32, 54, and 34, 56, are made from cross-sectionally circular or ovoidal shape, without any sharp edge, to prevent injuries or cuts to the animal.

As shown in FIG. 1, the flexible yet sturdy elongated lace 62 extends in a loop co-extensively into channels 58, 60 and against the interior faces (i.e. facing one another) of flanges 28, 30. The opposite ends of lace 62 are slidingly interconnected by a slip-knot attachment member 64. Lace 62 should have a soft external surface, e.g. a soft plastic sheathing embedding a flexible metallic core wire.

To keep the jaws 32, 34, in their cocked coplanar spread apart condition shown in FIG. 1, against the transverse bias of spring leg 46, there is provided a releasable locking means 66. Locking means 66 includes a pivot mount 68, fixedly mounted to the end portion 26a of ground frame leg 26, and an elongated locking arm 70 pivotally carried by the pivot mount 68 for pivotal motion about an axis generally parallel to the plane of ground frame 24, 26. Locking arm 70 includes an end notch 70a, sized for releasable engagement by registering sections of jaw wires 32, 54. Pivot mount 68 is of the friction fit type, i.e. that locking arm 70 will stand by its own at any inclined position over underlying main frame 24, 26, and will not pivot freely about pivot mount 68. Arm 70 will start pivoting once a load is applied beyond a minimum threshold level, to forcibly pivot arm 70 about pivot 68.

Figure 2:
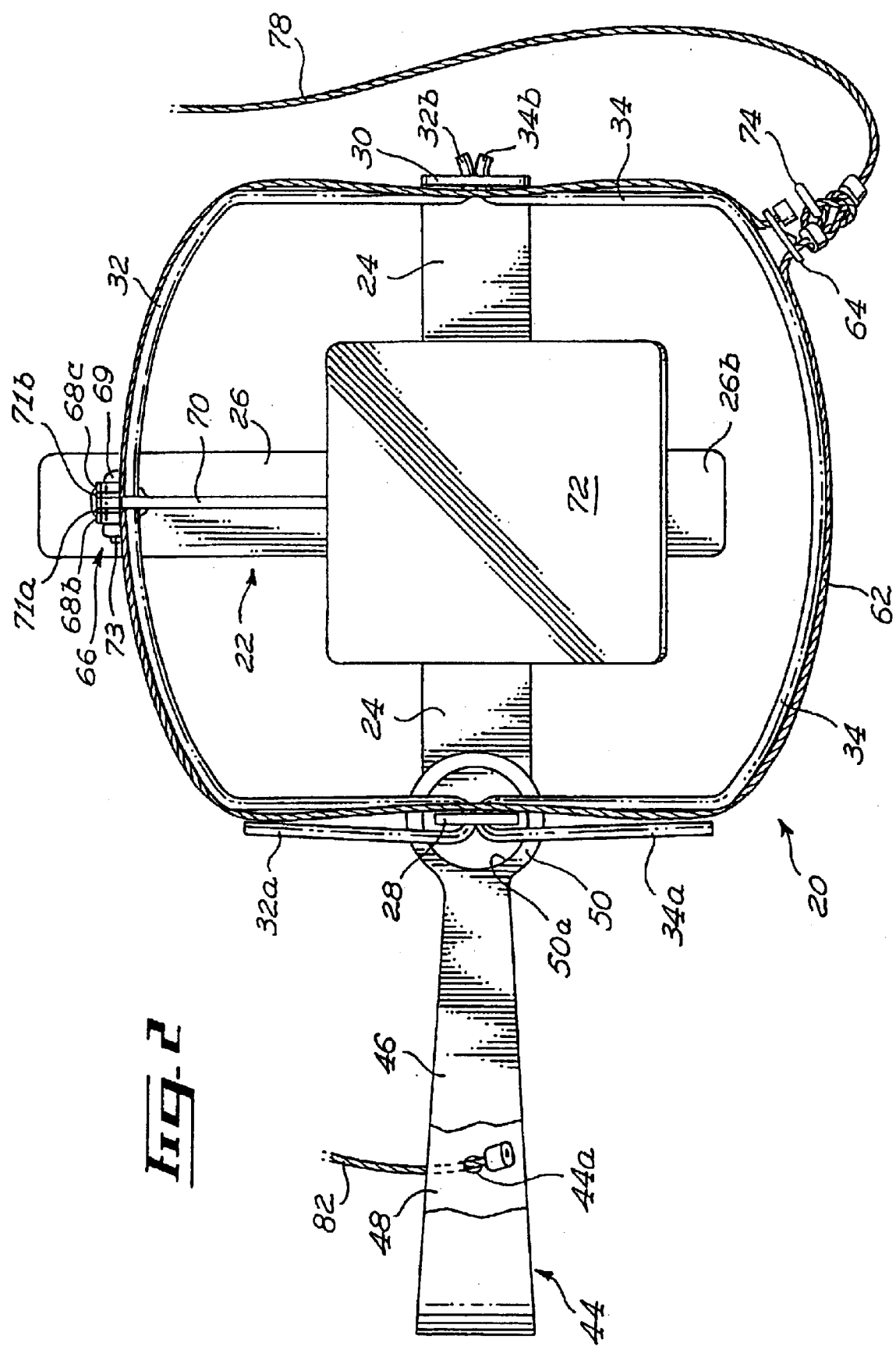
FIG. 2 is a top plan view of the animal trap.

Preferably, a tension adjusting screw 68a is provided at pivot mount 68, to adjust the friction fit minimum threshold level required to start moving pivot arm 70 about pivot 68. As illustrated in FIG. 2, pivot mount assembly 68, 68a, may consist for example of a pair of upright transversely bored bracket plates 68b, 68c, anchored to the outer end portion of main frame leg 26, a bolt 69 extending transversely through bracket plates 68b, 68c, a pair of nylon washers 71a, 71b, and a partly tightened nut 73 at the end of bolt 69.

The pivotal load on pivot arm 70 can be applied for example by providing a trigger plate 72 fixed to the inner end of arm 70 opposite notch 70a.

In use, in the cocked trap condition of FIG. 1, notch 70a is engaged by a section of jaw wires 32, 34, locking arm 70 is upwardly inwardly inclined from its notch end 70a to its opposite inner end. Jaw 32, 54 abuts against arm 70 in notch 70a. Spring member lower end 52 engages recess 38, and spring member upper end 50 is tensioned against jaw 32, 54. Jaw 34, 56 is loose, but will be manually positioned coplanar with the other jaw 32, 54 and will maintain this position under its own weight when trap 20 is positioned on the ground. Loop lace 62 is installed in channel 58, 60.

Figure 3:
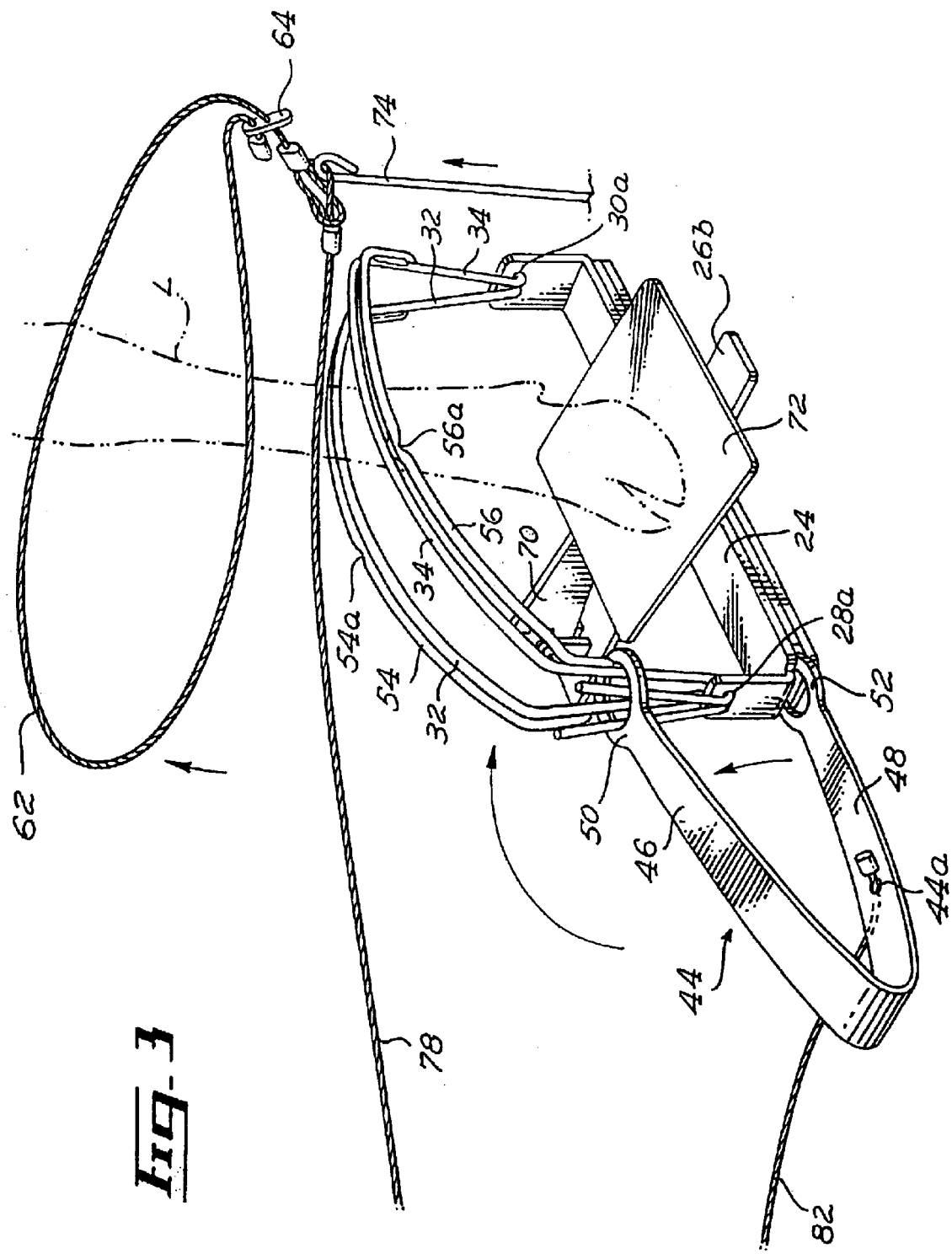
FIG. 3 is a perspective view of the animal trap, shown in its uncocked condition, with the jaws thereof shown as being drawn together against the leg of an animal illustrated in phantom lines, and suggesting the release of the lace first ground peg under load from the trapped animal.

By applying a downward load against trigger plate 72, as when a wild animal sets foot on plate 72 to retrieve a bait, the locking arm 70 tilts downwardly inwardly, thus releasing jaw wires 32, 54 from its notch 70a. This in turn enables the spring member 44 to express its upward bias against the hook members 32a, 34a, so as to close the jaws 32, 54 and 34, 56 toward each other against the wild animal leg L (FIG. 3). The lace loop 62 is carried upwardly against the animal leg by jaws 32, 54 and 34, 56 and still loosely surrounds the animal leg L at this point. Lace loop 62 is thus carried spacedly over ground by jaws 32, 54, 34, 56, and in turn carries in its upward movement a first lightweight ground anchored upright peg 74, which will remain partly anchored as shown in FIG. 3.

Once the wild animal feels he is caught by the trap jaws 32, 54, 34, 56, he will kick and struggle to break free of trap 20. This will bring about first of all the tightening of the slip-knot lace loop 62 around the animal leg L. Indeed, as suggested in FIG. 4, since the first ground peg 74 is immediately adjacent the lace loop 62, as the animal moves his leg away from first ground peg 74, the lace loop 62 will tighten against the animal's leg. This in fact occurs within moments after the jaws have closed on the animal leg. When the animal is ensnared, the ground peg 74, which protrudes over ground at this point, will eventually be desirable pulled out from the ground. Thus, the purpose of first ground peg 74 is not to retain the animal in any way, but only to help ensnare the animal.

Loop 62 is spacedly connected to a second heavy-duty ground peg 76 by a first elongated anchor line 78. The size and shape of this second heavy duty ground peg 76 and of first anchor line 78 is such as to positively prevent the wild animal caught by the trap 20 from moving away beyond a distance corresponding to the combined length of lace 62 and first anchor line 78 less the remaining lace loop around the wild animal leg L. However, the animal will not pull on first anchor line 78 before the length limit of a second elongated anchor line 82 is reached, as detailed hereinafter.

The trap spring member 44 is spacedly connected to a third heavy duty ground peg 80 by second anchor line 82. More specifically, second anchor line 82 is attached to an intermediate section 44a of spring member 44 at its first end, and to ground peg 80 at its second end. Ground peg 80 and second anchor line 82 are sized and shaped to positively prevent the caught animal from moving the spring member 44 by a distance greater than the length of second anchor line 82.

Figure 4:
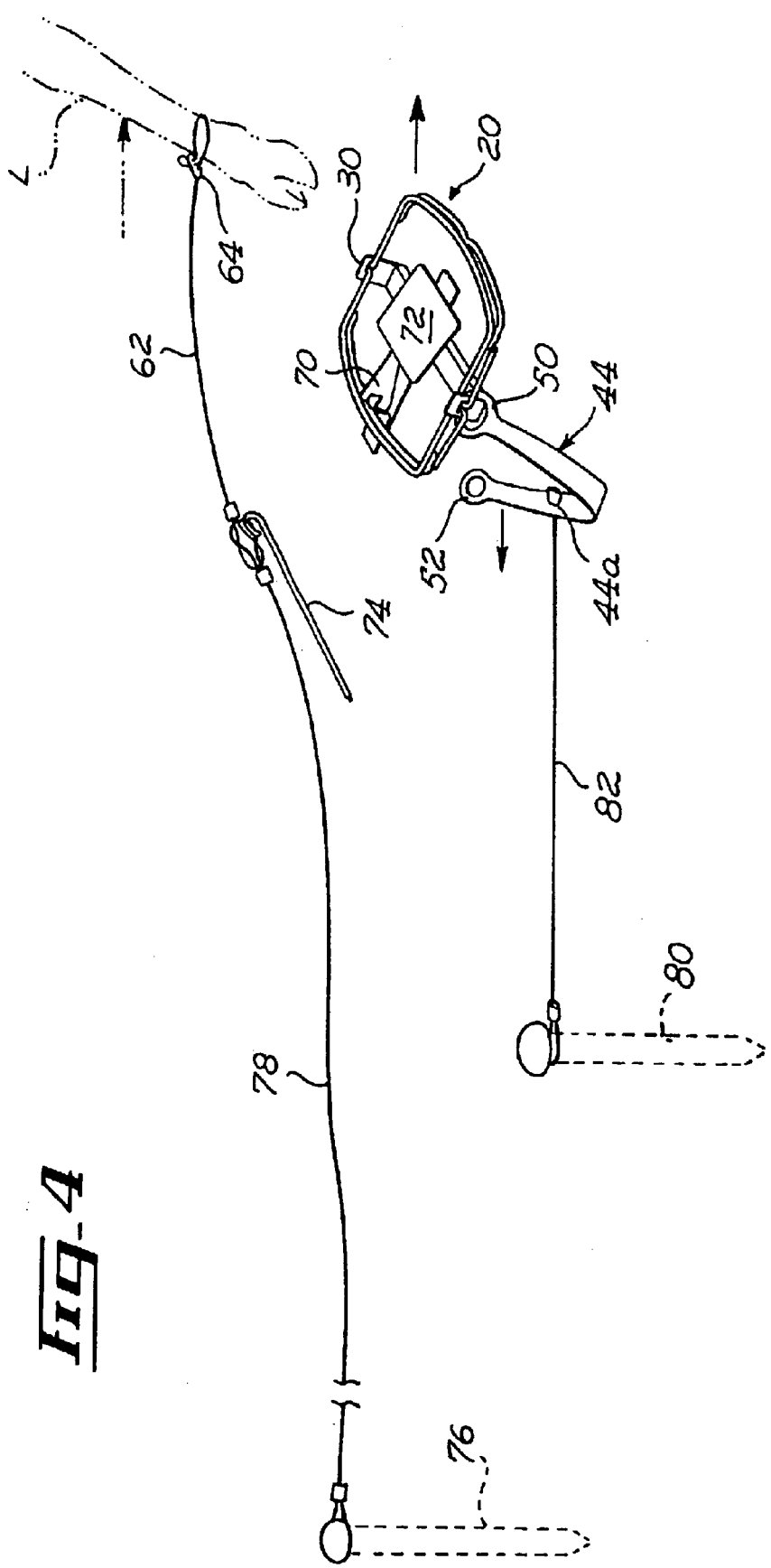
FIG. 4 is a view similar to FIG. 3, but at a smaller scale and suggesting how the lace second ground peg and trap ground peg remain anchored into the ground as the trapped animal leg releases the uncocked trap.

As suggested in FIG. 4, as the animal moves away from the original location of the trap 20, he carries trap 20 along with him and consequently it pulls anchor line 82 which is anchored by ground peg 80. As sequentially suggested in FIGS. 8, 9 and 10 and as explained hereinabove, as soon as handle member 44 is pivoted about trap frame 24, 26, this will enable release of the spring member lower leg 48 from the frame recess 36, by clearing boss 38a.

Such pivotal displacement on spring member 44 will occur during these frantic movements of the trapped animal at the end of its anchor line 82. As spring member lower end 52 is released from the trap frame 24, there is concurrent release of the spring load of spring member 44 onto jaws 32, 54 and 34, 56, so that these two jaws spread apart and return to their open uncocked condition. The animal is therefore free of the jaws 32, 54, 34, 56, which release and detach from the animal, as suggested in FIG. 4.

Once the rigid frame of trap 20 has been removed from the animal leg, the animal will then be retained by the longer first anchor line 78. He may however move freely around peg 76. This is desirable, since it provides some mobility to the animal, which may be able to hide beneath vegetation cover. In hiding, the stress level of the animal is reduced, even if still attached by the tightened lace loop 62. This will decrease the likelihood of bodily injuries for the caught animal.

Accordingly, the present animal double jaws 32, 54, and 34, 56, are not used for containment of the animal at all. The purpose of jaws 32, 54 and 34, 56 is simply to ensure that lace loop 62 will positively engage the animal leg above ground level. Jaws 32, 54 and 34, 56 maintain lace loop 62 over the rigid frame of trap 20 at all times, and their sudden concurrent pivotal movement against each other when the trap is triggered, allows the lace loop to be brought against the animal leg quickly enough to prevent the animal from escaping the trap. Also, the fact that lace loop 62 is located above the trap frame ensures that the rigid frame will not be ensnared concurrently with the animal leg, to then be flailed about as the animal struggles to free himself. Thus, injury to the animal is less likely.

The biasing strength of spring member 44 is not enough to injure the animal with the blunt jaws 32, 45, 34, 56.

It is noted that this animal trap will be effective even if concealed in shallow subsurface soil. It is also effective in an omni-directional fashion, i.e. that an animal sized for this trap 20 will be caught equally if it comes from over handle 44, from over double jaw 32, 54, from over the trap edge opposite handle 44, or from over the double jaw 34, 56.

I claim:

1. A trap for ensnaring animals comprising:
a snare comprising a loop lace, a loop lace anchoring line linked to the loop lace and anchoring means for fixedly anchoring the anchoring line, said loop lace defining a first length and said loop lace anchoring line defining a second length;
a ground-resting frame;
first and second jaws pivotally carried by said frame, said jaws being movable between an opened position in which said first and second jaws are spread apart, and a closed position in which said first and second jaws are closed against each other;
releasable biasing means that bias said jaws towards said closed position; said biasing means being a resilient U-shaped spring member defining a first leg and a second leg, with said first leg releasably engaging a recess in said frame and with said second leg engaging said first and second jaws to bias said jaws towards said closed position, said trap further comprising a spring member anchor line attached to said spring member at a first end thereof and destined to be fixedly anchored at a second end thereof, said spring member anchor line defining a third length, whereby said spring member first leg can be forcibly removed from said recess to disable said biasing means thus selectively canceling its biasing action on said jaws;
a lock movable between a first operative position, in which it retains said jaws in said opened position against the bias of said biasing member, and a second inoperative position in which it releases said jaws to allow them to move towards said closed position under the bias of said biasing mean;
a lock trigger for forcing said lock towards said inoperative position upon a load being applied thereon; and
a loop lace channel carrying said snare loop lace and comprising a first channel portion on said first jaw and a second channel portion on said second jaw, said first and second channel portions thus being movable with said first and second jaws, respectively, between said opened and closed positions of said jaws and carrying said loop lace with said jaws from said opened position towards said closed position, for positively moving said loop lace around an animal leg upon said jaws being triggered to move into said closed position on the animal leg; and a temporary retaining device on said anchoring line intermediate said loop lace and said anchoring means, said temporary retaining device being destined to be releasably anchored, the combined length of said loop first length and the position of said second length extending between said loop lace and said temporary retaining device being equal to or less than said third length, and said third length being less than said second length.

2. A trap as defined in claim 1, wherein said temporary retaining device is a ground peg for releasable engagement of said ground peg in the ground.

* * * * *